(12) United States Patent
Mauer et al.

(10) Patent No.: US 8,666,383 B1
(45) Date of Patent: Mar. 4, 2014

(54) AUTOMATED BRANDING OF GENERIC APPLICATIONS

(75) Inventors: Brian D. Mauer, Shawnee, KS (US); Kenneth J. Raaf, Laguna Niguel, CA (US); M. Jeffrey Stone, Overland Park, KS (US); Robert L. Waldrop, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 142 days.

(21) Appl. No.: 13/335,941

(22) Filed: Dec. 23, 2011

(51) Int. Cl.
*H04M 3/00* (2006.01)
*H04M 1/00* (2006.01)

(52) U.S. Cl.
USPC ...................................... 455/418; 455/552.1

(58) Field of Classification Search
USPC ........ 455/418–422.1, 432.1, 435.1, 459, 460, 455/550.1, 552.1, 553.1, 556.1, 556.2, 455/563–569.1; 370/310.2, 328, 338
See application file for complete search history.

(56) References Cited

U.S. PATENT DOCUMENTS

| | | | |
|---|---|---|---|
| 7,266,371 B1 | 9/2007 | Amin et al. | |
| 7,493,111 B2 | 2/2009 | Knowles | |
| 7,904,895 B1 | 3/2011 | Cassapakis et al. | |
| 8,260,281 B2 | 9/2012 | Urbanek | |
| 8,401,538 B2 | 3/2013 | Urbanek | |
| 8,571,536 B2 | 10/2013 | Urbanek | |
| 8,612,967 B1 | 12/2013 | Delker | |
| 2006/0154651 A1 | 7/2006 | Knowles | |
| 2007/0099599 A1 | 5/2007 | Smith et al. | |
| 2007/0130156 A1* | 6/2007 | Tenhunen et al. | 707/10 |
| 2007/0254635 A1* | 11/2007 | Montelius | 455/414.1 |
| 2008/0281511 A1* | 11/2008 | Miyata | 701/207 |
| 2009/0061840 A1* | 3/2009 | Fleischman et al. | 455/419 |
| 2009/0093242 A1 | 4/2009 | Bhalekar et al. | |
| 2009/0106200 A1 | 4/2009 | Salinas et al. | |
| 2009/0239518 A1* | 9/2009 | Feuillette | 455/418 |
| 2009/0247124 A1* | 10/2009 | de Atley et al. | 455/410 |
| 2009/0260004 A1 | 10/2009 | Datta et al. | |
| 2010/0075669 A1 | 3/2010 | Sparks et al. | |
| 2010/0133335 A1 | 6/2010 | Maguid et al. | |
| 2010/0136960 A1 | 6/2010 | Knezevic | |
| 2010/0167696 A1 | 7/2010 | Smith et al. | |
| 2010/0207742 A1 | 8/2010 | Buhot et al. | |
| 2010/0222047 A1* | 9/2010 | Vanderlinden et al. | 455/418 |
| 2010/0262638 A1 | 10/2010 | Fitzgerald | |
| 2010/0325622 A1 | 12/2010 | Morton | |
| 2011/0026501 A1* | 2/2011 | Sharaga et al. | 370/338 |

(Continued)

FOREIGN PATENT DOCUMENTS

| | | | |
|---|---|---|---|
| WO | 2012078753 A1 | 6/2012 | |
| WO | 2013169983 A1 | 11/2013 | |

OTHER PUBLICATIONS

Foreign Communication from a Related Counterpart—International Search Report and Written Opinion, PCT/US2011/063736.

(Continued)

*Primary Examiner* — San Htun

(57) ABSTRACT

A mobile phone comprising a processor, a memory comprising a system partition and a data partition, and an application stored in the system partition of the memory. When executed by the processor, the application determines a brand identity associated with the mobile phone, accesses branding assets associated with the application based on the brand identity, and adapts the function of the application based on the accessed branding assets.

20 Claims, 6 Drawing Sheets

(56) References Cited

U.S. PATENT DOCUMENTS

| | | |
|---|---|---|
| 2011/0030062 A1 | 2/2011 | Hsu et al. |
| 2011/0138074 A1 | 6/2011 | Onda et al. |
| 2011/0165836 A1 | 7/2011 | Dixon et al. |
| 2012/0036282 A1* | 2/2012 | Chen et al. .................. 710/9 |
| 2012/0129513 A1* | 5/2012 | van der Laak ............ 455/419 |
| 2012/0129572 A1* | 5/2012 | Johnstone et al. ...... 455/552.1 |
| 2013/0137417 A1 | 5/2013 | Urbanek |
| 2013/0303142 A1 | 11/2013 | Burcham et al. |

OTHER PUBLICATIONS

Notice of Allowance dated Apr. 26, 2012, U.S. Appl. No. 12/962,620, filed Dec. 7, 2010.

Notice of Allowance dated Nov. 2, 2012, U.S. Appl. No. 13/556,202, filed Jul. 24, 2012.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Urbanek, Robert E., "System and Method of Wireless Communication", filed Dec. 7, 2010, U.S. Appl. No. 12/962,620.

Urbanek, Robert E., "System and Method for Generic Mobile Phone Configuration", filed Jul. 24, 2012, U.S. Appl. No. 13/556,202.

Urbanek, Robert E., "System and Method for Generic Mobile Phone Configuration", filed Jan. 28, 2013, U.S. Appl. No. 13/752,386.

Delker, Jason R., "Loading Branded Media Outside System Partition", filed May 31, 2011 U.S. Appl. No. 13/149,505.

Burcham, Robert H., et al., "Self-Identification of Brand and Branded Firmware Installation in a Generic Electronic Device", filed May 9, 2012 U.S. Appl. No. 13/468,028.

Urbanek, Robert E., "Generic Mobile Devices Customization Framework", filed Sep. 18, 2012, U.S. Appl. No. 13/622,234.

Annan, Brandon C., et al.,"System and Method of Branding and Labeling a Mobile Device", filed Mar. 15, 2013, U.S. Appl. No. 13/844,104.

Annan, Brandon C., et al.,"System and Method of Storing Service Brand Packages on a Mobile Device", filed Feb. 8, 2013, U.S. Appl. No. 13/763,428.

Annan, Brandon C., et al.,"System and Method of Provisioning and Reprovisioning a Mobile Device Based on Self-locating", filed Feb. 8, 2013, U.S. Appl. No. 13/763,434.

Annan, Brandon C., et al.,"Electronic Fixed Brand Labeling", filed Feb. 8, 2013, U.S. Appl. No. 13/763,443.

Ghoshal, Jagannath, et al.,"Rebranding a Portable Electronic Device While Maintaining User Data", filed May 22, 2013, U.S. Appl. No. 13/899,567.

Ghoshal, Jagannath, et al.,"System and Method for Retrofitting a Branding Framework into a Mobile Communication Device", filed May 21, 2013, U.S. Appl. No. 13/899,566.

Foreign Communication from a Related Counterpart Application, "Preliminary Report on Patentability", dated Jun. 20, 2013, PCT/US2011/063736 filed on Dec. 7, 2011.

Foreign Communication from a Related Counterpart—International Search Report and Written Opinion, dated Jul. 24, 2013, PCT/US13/40278, filed on May 9, 2013.

Notice of Allowance dated Jun. 21, 2013, U.S. Appl. No. 13/752,386, filed Jan. 28, 2013.

Notice of Allowance dated Aug. 9, 2013, U.S. Appl. No. 13/149,505, filed May 31, 2013.

Delker, Jason R., "Loading Branded Media Outside System Partition", filed Oct. 30, 2013 U.S. Appl. No. 14/066,947.

* cited by examiner

AUTOMATED BRANDING OF GENERIC APPLICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices may be manufactured in a substantially similar hardware and software platform and distinguished based on branding information associated with the devices. For example, a battery cover featuring a Brand X logo may be attached to a first electronic device, and a battery cover featuring a Brand Y logo may be attached to a second electronic device. The first and second electronic devices may have substantially the same hardware and software and be distinguished only by the different brand logos on their battery covers. The branding distinctions may extend further to include distinct branded splash screens that display when applications execute on the electronic devices, to include distinct audio cues that sound when events occur on the electronic devices, and to include other branding differences. The branding of electronic devices may be performed as part of the manufacturing process. In this case, electronic devices that share common hardware and software but that are manufactured as different brands are likely to be associated with different stock keeping unit (SKU) identities and may require to be tested separately.

Mobile virtual network operators (MVNOs) are businesses that may lease mobile communication services from wireless communication carriers. Thus, mobile virtual network operators may not own cellular towers, mobile switching centers (MSCs), gateways, and other communications infrastructure but instead may pay fees to the owners of this communication infrastructure to carry the communications traffic of their subscribers. The mobile virtual network operators may wish that their subscribers use mobile phones that feature their branding rather than the branding of the owner of the communications infrastructure, whereby to own and control the subscriber relationship. At the same time, some mobile virtual network operators may be associated with a small number of subscribers, at least initially, and may have difficulty negotiating with mobile phone manufacturers to make a small run of mobile phones manufactured to feature branding associated with their business.

SUMMARY

In an embodiment, a mobile phone is disclosed. The mobile phone comprises a processor, a memory comprising a system partition and a data partition, and an application stored in the system partition of the memory. When executed by the processor, the application determines a brand identity associated with the mobile phone, accesses branding assets associated with the application based on the brand identity, and adapts the function of the application based on the accessed branding assets.

In an embodiment, an electronic device is disclosed. The electronic device comprises a processor, a memory, and an application stored in the memory. When executed by the processor, the application determines a first brand identity associated with the electronic device at a first time, accesses a plurality of first branding assets associated with the application based on the first brand identity, and adapts the function of the application based on the accessed plurality of first branding assets, whereby the application provides a first branded user experience. The application further determines a second brand identity associated with the electronic device at a second time, accesses a plurality of second branding assets associated with the application based on the second brand identity, and adapts the function of the application based on the accessed plurality of second branding assets, whereby the application provides a second branded user experience, wherein the first branded user experience is different from the second branded user experience.

In an embodiment, an electronic device is disclosed. The electronic device comprises a processor, a memory, and an application stored in the memory. When executed by the processor, the application determines a brand identity associated with the mobile phone, accesses subscriber profile information, where the profile information comprises at least one of a sex of the subscriber, an age of the subscriber, a city of the subscriber, an education level of the subscriber, an income level of the subscriber, a sports team affiliation of the subscriber, and a personal interest of the subscriber, accesses branding assets associated with the application based on the brand identity and based on the subscriber profile information, and adapts the function of the application based on the accessed branding assets.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
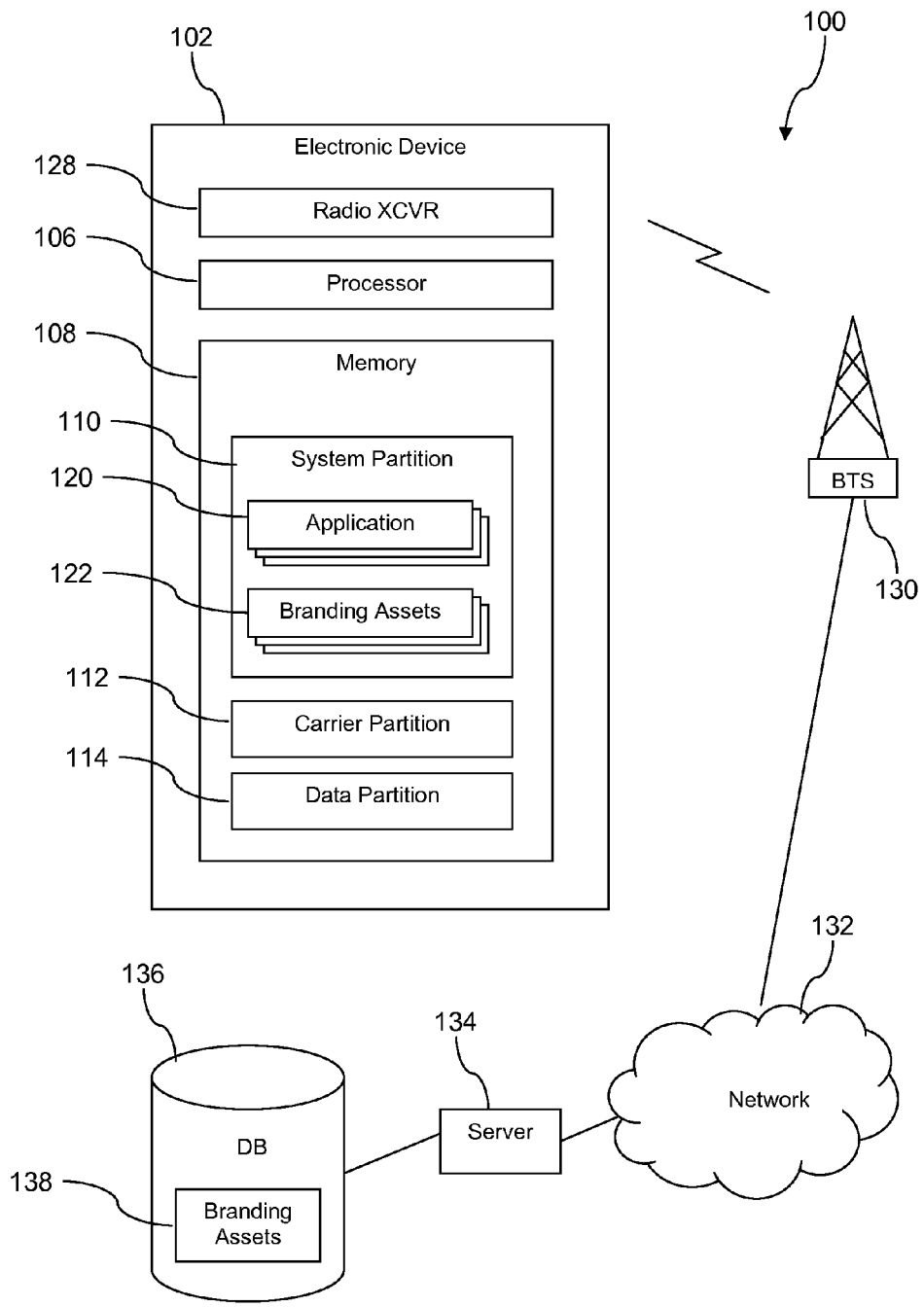
FIG. 1 is an illustration of a branding system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In one embodiment, an electronic device that is provided in an initial state with an initially unbranded generic application is taught. The initially unbranded generic application may be a web browser application, an electronic mail application, a calendar application, a dialer application, a visual voice mail application, or other application. The initially unbranded generic application works with a plurality of different brands, automatically determines a brand associated with the device, and then adapts itself to provide a branded experience to a user of the electronic device when the subject generic application executes. For example, the generic application may determine its brand identity, select pre-loaded branding assets that are associated with the subject brand identity, and configure itself to present a splash screen defined in the selected pre-loaded branding assets, to receive a real simple syndication (RSS) feed from a source defined by the selected pre-loaded branding assets, and to employ a color scheme of its user interface that is defined by the selected pre-loaded branding assets.

In another embodiment, the electronic device may be provided in an initial state with an initially branded generic application where the generic application can be rebranded using the same mechanisms taught by the present disclosure. The electronic device may be rebranded, for example, when a user migrates the electronic device from a first wireless communication service provider to a different wireless communication service provider. The electronic device may be rebranded, in another example, when a wireless service provider repurposes a plurality of electronic devices initially designated for use with a first brand to instead be used with a second brand.

By ordering electronic devices in an initially unbranded state and then causing the devices to change to a variety of different brands after receipt of the electronic devices from the manufacturer, a provider of the devices may be able to realize a variety of economic benefits. By ordering a large number of generic devices, the provider may be able to negotiate a lower price on the generic devices due to volume discounts. The price for a lot of 100,000 devices may be less than the summed price for buying five different lots of 20,000 devices each, due to volume discounts offered by the original equipment manufacturer (OEM). Additionally, device testing efficiencies may be realized. For example, it may be less expensive to test the unbranded electronic devices once than to test each of the five branded electronic devices once (which amounts to five different test runs). This efficiency may extend to the testing of patches and/or software updates provided though the service life of the electronic devices. Some applications and branded content may be specific and exclusive to particular brands. The generic applications referred to above, however, are applications that typically find a use under all branded variants of the electronic device. A variety of approaches to delivering the functionality of these applications under different brands can be enumerated. One approach is to deliver a generic application devoid of any branding information. Typically brand sponsors may feel this neglects a valuable opportunity for them to obtain the marketing advantages associated with branding and hence may reject this approach. Another approach is to deliver a different unique application containing the branding information for each different branded variation of the electronic device. This solution may be acceptable to brand sponsors but is complicated, may require extra labor to be provided by highly skilled and expensive personnel to load the subject branded applications onto the electronic device, and may entail additional development work to create the different branded applications, all of which lead to higher costs that are absorbed by the supplier and/or by the brand sponsor. The solution taught by the present disclosure is a hybrid approach. The generic application may be composed of a plurality of generic assets as well as a plurality of branding assets that are identified and/or referenced after completion of the manufacturing process.

In an embodiment, the branding assets may be stored along with the generic application in a protected memory region that is not conveniently accessible to the ordinary user. For example, the branding assets may be stored in a system partition of the memory. Alternatively, the branding assets may be stored in a carrier memory partition that is separate from system memory and separate from data memory. Alternatively, some of the branding assets may be stored in and retrieved by the electronic device from a data store accessible via a wireless communication link into a network to which the data store is coupled.

In an embodiment, when the generic application executes, it may determine its brand identity and use this brand identity to configure itself, to select content such as splash screens, wallpaper, background, user interface styles, settings, locations or references to initialize real simple syndication (RSS) feeds, and other. This may be done each time the generic application executes. Alternatively, in an embodiment, the generic application may execute branding once and set a branding flag. When the branding flag is set, the generic application does not execute branding when initializing. If rebranding is desired, for example when a subscriber changes carrier and/or brand of communications service, the branding flag may be reset, thus when the generic application next initializes it goes through the branding procedure, in this case associating the generic application with the new branding.

For further discussion of branding generic devices see U.S. patent application Ser. No. 12/962,620, filed Dec. 7, 2010, entitled "System and Method of Wireless Communication," by Urbanek and U.S. patent application Ser. No. 13/149,505, filed May 31, 2011, entitled "Loading Branded Media Outside System Partition" by Delker, both of which are hereby incorporated by reference in their entirety. By contrast with the present disclosure, U.S. patent application Ser. No. 12/962,620 teaches identifying applications that are not used by all versions of a generic electronic device, pre-loading these applications as firmware in the generic electronic device as dormant firmware, and selectively enabling the appropriate applications at a later time when branding the initially unbranded generic electronic device. U.S. patent application Ser. No. 13/149,505 teaches loading brand-specific files to a non-system partition memory area of the generic device that were not pre-loaded, whereby to provide some of the branding content such as electronic representations of logos, ring tones, applications, customized controls and switches. The brand-specific files may be loaded from a removable memory card inserted into a slot of the generic device during branding. While the teachings of U.S. patent application Ser. No. 12/962,620 and of U.S. patent application Ser. No. 13/149, 505 may be considered to be complementary to the teachings of the present disclosure in some ways, the teachings of the present disclosure do not depend on the generic device embodying the teachings of U.S. patent application Ser. No. 12/962,620 or of U.S. patent application Ser. No. 13/149,505.

Turning now to FIG. 1, a system 100 is described. In an embodiment, the system 100 comprises an electronic device 102. The electronic device 102 may be adaptable to branding to any of a plurality of different brands. For example, after manufacturing, the electronic device 102 may be branded to Brand X, to Brand Y, or to some other brand. The process of branding the electronic device 102 may include attaching a battery cover to the electronic device 102 having a brand specific logo or other graphic element. The process of branding may further include loading brand specific applications, brand specific content, brand specific settings, or other branding information based on a brand identity into the electronic device 102. In an embodiment, the electronic device 102 may be a mobile phone, a personal digital assistant (PDA), or a media player. Alternatively, the electronic device 102 may be a desktop computer, a laptop computer, a notebook computer, or other personal computing device.

The electronic device 102 comprises a processor 106 and a memory 108. In an embodiment, the memory 108 may comprise a system partition 110, a carrier partition 112, and a data partition 114. In some embodiments, however, the memory 108 does not have a carrier partition 112. The data partition 114 may be accessed by applications and/or functionalities of the electronic device 102 and may be altered and/or accessed by a user of the electronic device 102. For example, a user of the electronic device 102 may change information in the data partition 114 when adding entries to a contacts data store facility of the electronic device 102 or when adding a personal note using a note making facility of the electronic device 102. As another example, the user of the electronic device 102 may download and install applications purchased from an on-line store into the data partition 114. In some contexts the system partition 110 may be referred to as a protected partition, a protected region, or the like.

Generally, an ordinary user of the electronic device 102 cannot conveniently change the information in the system partition 110 by direct interaction. Applications may be placed in the system partition 110 to reduce the opportunity for users to corrupt complicated, sophisticated applications, for example web browser applications, phone dialer applications, electronic mail applications, and the like. With reference to such applications, the ability of users of the electronic device 102 to configure the applications may preferably be mediated through controls provided by the applications themselves, where these controls may limit the level of interaction of the user with the system partition 110, thereby preventing the user from disabling the function of the subject application or some other application of the electronic device 102.

One or more generic applications 120 may be stored in the system partition 110. As used herein, a generic application 120 is characterized as an application whose base function is expected to be used on the electronic device 102 no matter what brand identity is applied to the electronic device 102. Alternatively, a generic application 120 may be an application whose base function may not be used by one or two branded variations of the electronic device 102, but is expected to be used by a plurality of branded variations of the electronic device 102. A web browser application, for example, may be expected to be used by the electronic device 102 when branded to a plurality of different branded variations. Other examples of generic applications 120 are an electronic mail application, a calendar application, a dialer application, and a contacts data store application. It is understood that some brand owners may wish to customize and/or brand one or more of these generic applications 120, but notwithstanding the base function of the subject generic applications 120 may remain the same. The base function of a browser generic application will be to access and present hypertext markup language (HTML) content based on universal reference locators (URLs) or other links, notwithstanding that it is branded for Brand X or for Brand Y. The base function of an email generic application will be to send and receive electronic mail messages, notwithstanding that it is branded for Brand X or for Brand Y.

In an embodiment, the generic application 120 may be composed of generic components and of branding assets 122. The generic components and/or firmware may deliver the common and/or base functionality of the generic application 120. As illustrated in FIG. 1, these generic components may be considered to be included in the application 120 block. The branding assets 122 may provide a branded splash screen, one or more branded audio tones, one or more branded settings to apply to the generic application 120, one or more brand specific links such as a link to a real simple syndication (RSS) feed address, a link to an on-line store affiliated with the brand, executable instructions for brand specific functionality, and other brand specific information. The branding assets 122 are understood to comprise different sets of branding assets. For example, the branding assets 122 may comprise a first set of branding assets 122 defined by Brand X for branding the generic application 120; a second set of branding assets 122 defined by Brand Y for branding the generic application 120; and additional sets of branding assets 122 defined by other brands for branding the generic application 120 for their specific brands.

When the generic application 120 executes, for example the first time the generic application 120 is invoked, the generic components may determine a brand identity of the electronic device 102 and based on the brand identity select from the branding assets 122 to brand the generic application 120. The brand identity may have been defined for the electronic device 102 as a provisioning step after completion of the manufacturing process but before the user takes the electronic device 102 home from a retail store or receives the electronic device 102 in a delivery to their home. Alternatively, the brand identity may be provided over-the-air when the electronic device 102 is powered on initially. Alternatively, the brand identity may be determined automatically by the electronic device 102 by analyzing a network access identity (NAI) or other identity or security token associated with the electronic device 102. Alternatively, the brand identity may be transmitted to the electronic device 102 in a message from a wireless network, for example embedded in a brand identity parameter in an open mobile alliance (OMA) message. In an embodiment, this process of branding may occur every time the generic application 120 is activated and/or loaded for execution. Alternatively, the branding process may occur one time, a branding flag may be toggled to indicate that branding has been completed, and thereafter the association of the branding assets 122 associated with the brand identity of the electronic device 102 is maintained.

Some of the branding information that may be involved in branding the generic application 120 may be accessed via a communication network. In an embodiment, the electronic device 102 may establish a communication link between a radio transceiver 128 of the electronic device 102 and a base transceiver station 130. The base transceiver station 130 may couple the electronic device 102 to a network 132. The network 132 may comprise any combination of private networks and public networks. A server computer 134 may be connected to the network 132 and thereby accessible to the electronic device 102. The server 134 provides access to remotely stored branding assets 138 stored in a data store 136.

In an embodiment, the functionality of the generic application 120 accessing some of the remotely stored branding assets 138 via the network 132 may promote a brand owner updating their branding assets conveniently. In an embodiment, the brand owner may be able to push a message to the electronic device 102 that causes the generic application 120 to complete the branding process, thereby acquiring updated branding information in the remotely stored branding assets 138. Alternatively, the brand owner may be able to push a message to the electronic device 102 that causes the generic application 120 to complete a partial branding process that is restricted to retrieving updated branding assets 138 via the network 132.

In an embodiment, the generic application 120 may further customize itself based on a profile associated with the user of the electronic device 102. For example, the generic application 120 may access a user profile and/or subscriber profile stored in the memory 108 or alternatively access the user profile from a profile data store (not shown) via the network 132 and the base transceiver station 130. Based on the profile information, the generic application 120 may access branding assets 122 and/or remotely stored branding assets 138 that define a color scheme, a wallpaper, an aural cue, or other aspects associated with the generic application 120. These adaptations may involve adapting the presentation screen provided by the generic application. These adaptations may include selecting a real simple syndication (RSS) feed to activate based on the profile information. The generic application 120 may disable access to the user to the generic application 120 based on either the profile information or based on the brand identity. For example, the generic application 120 may make its invocation icon invisible and/or non-responsive to user selection. The subscriber profile and/or user profile may include information such as a sex of the subscriber, an age of the subscriber, a city of the subscriber, an education level of the subscriber, an income level of the subscriber, a sports team affiliation of the subscriber, and a personal interest of the subscriber.

Figure 2:
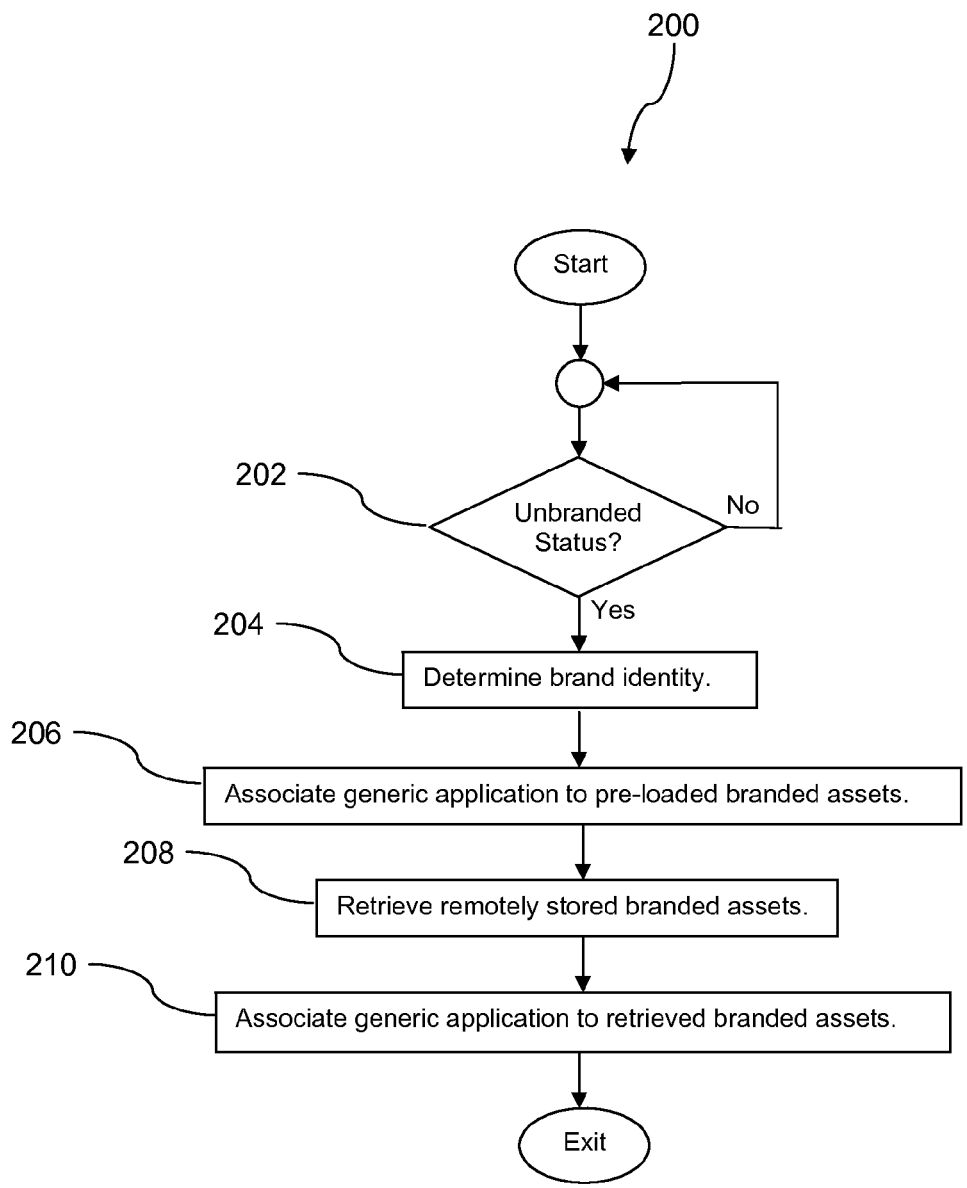
FIG. 2 is a flow chart of a method according to an embodiment of the disclosure.

Turning now to FIG. 2, a method 200 is described. At block 202, the branding status of the electronic device is determined. For example, a branding status stored in the memory 108 of the electronic device 102 may be read to determine whether the electronic device 102 is already branded or is instead unbranded. It is understood that the branding status may have an unbranded status even when the generic application 120 has in fact been previously branded, for example when the brand identity of the electronic device has been changed. If the branding status indicates that the electronic device 102 is already branded, the processing loops back to repeat block 202 iteratively. It is understood that the processing of method 200 and hence the repetition of block 202 may occur on some periodic basis so as to not waste processing capacity of the processor 106. Alternatively, the processing of method 200 may occur as a low priority task and hence not delay processing of higher priority tasks. In an embodiment, the processing of block 202 may be omitted and processing may invariably proceed directly to block 204. In this case, the processing of method 200 may occur only occasionally, for example on initialization of the generic application 120 or on boot-up of the electronic device 102 during power-on.

At block 204, a brand identity of the electronic device is determined. The brand identity may be stored in the memory 108. The brand identity may be stored in the memory during initial provisioning of the electronic device 102. Alternatively, the brand identity may be stored in the memory during an open mobile alliance (OMA) communication session of the electronic device 102. For example, the electronic device 102 may learn the brand identity from a brand identity parameter provided in an open mobile alliance message wireless received by the electronic device 102. Alternatively, the brand identity may be determined by analyzing a network access identity (NAI) of the electronic device and/or by analyzing other identifiers and/or security tokens associated with the electronic device 102. It is understood that the processing of blocks 202 and 204 may be performed once by the electronic device 102 and the results of this processing may be shared by a plurality of generic applications 120.

At block 206, the generic application 120 is associated with pre-loaded branding assets 122. The generic application 120 uses the brand identity determined in processing block 204 to select a set of branding assets 122 from among a plurality of sets of branding assets 122 stored in the system partition 110 and/or stored in the carrier partition 112. In an embodiment, the generic application 120 may copy the selected branding assets 122 into a memory space used by the generic application 120 when executing. Alternatively, the generic application 120 may update indices or references in the generic application 120 that point to or otherwise identify the branding assets 122 that will be used by the generic application 120 as it executes. For example, when the generic application 120 initializes, it may follow a reference to a branded splash screen branding asset 122 to fetch and present graphic content on a display of the electronic device 102.

At block 208, the generic application 120 may optionally retrieve remotely stored branding assets, for example remotely stored branding assets 138, based on the brand identity determined in block 204. The branding assets 122 may include an address or a link to the server computer 134 and/or to the remotely stored branding assets 138. At block 210, the generic application 120 is associated to the remotely stored branding assets 138. As above in block 206, the generic application 120 may associate to the selected remotely stored branding assets 138 in a number of different ways. The selected remotely stored branding assets 138 may be copied into a memory space associated with the generic application 120. Alternatively, references in the generic application 120 to branding assets may be updated to reference and/or point to the selected remotely stored branding assets 138.

It is understood that the processing of blocks 206, 208, and 210 may be performed for each of a plurality of different branded applications 120. For example, the processing of blocks 202 and 204 may be performed once. Thereafter the processing of blocks 206, 208, and 210 may be performed by a generic browser application. Then the processing of blocks 206, 208, and 210 may be performed by a generic electronic mail application. Then the processing of blocks 206, 208, and 210 may be performed by a generic calendar application.

Figure 3:
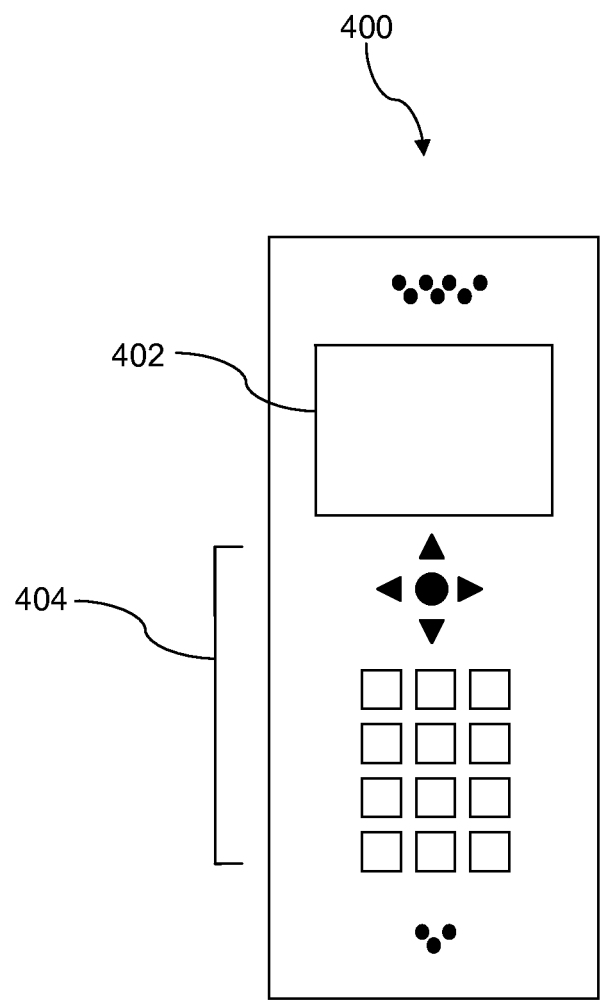
FIG. 3 is an illustration of a mobile phone according to an embodiment of the disclosure.

FIG. 3 shows a mobile device 400. FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
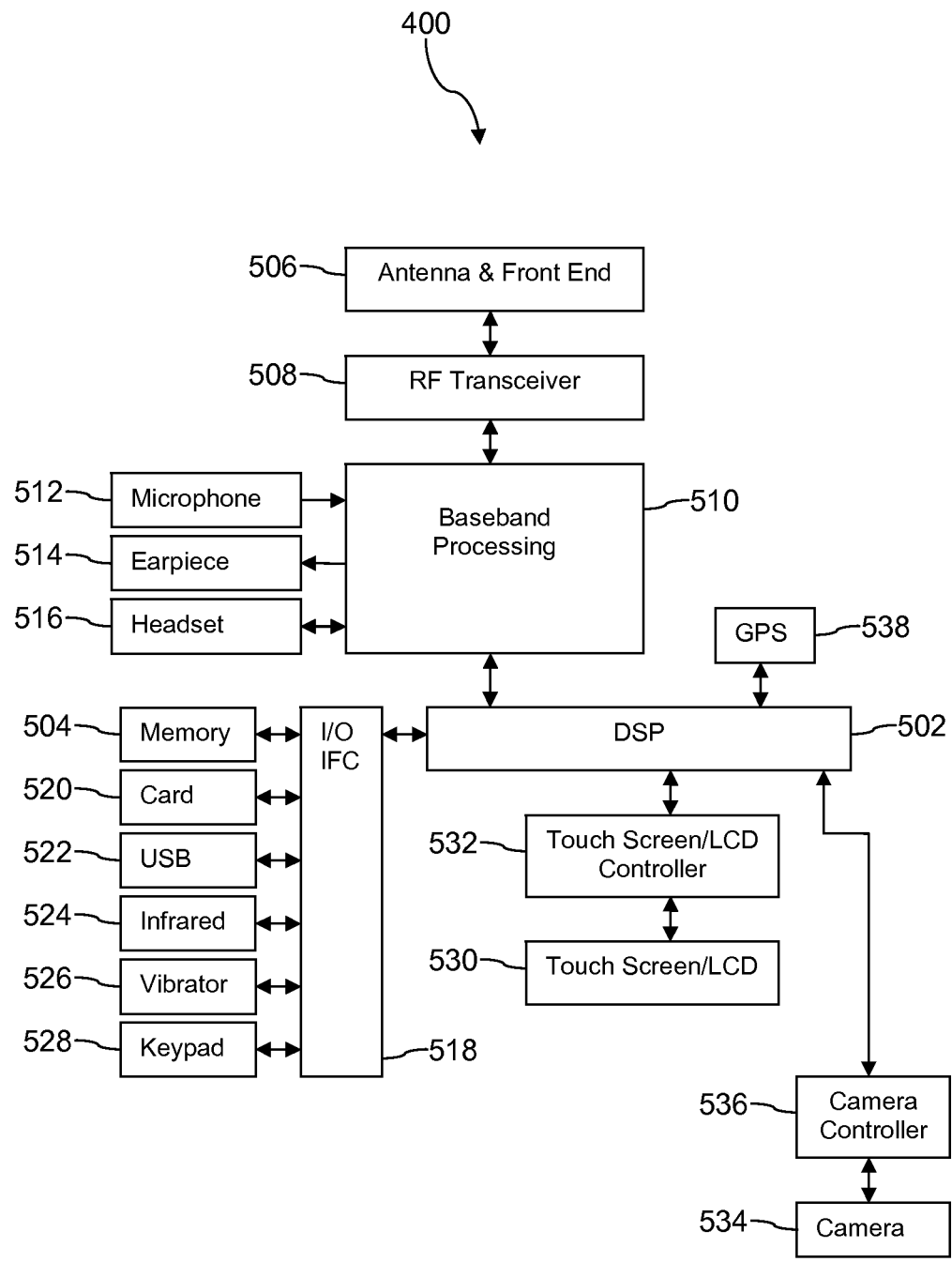
FIG. 4 is a block diagram of a mobile phone according to an embodiment of the disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 5A:
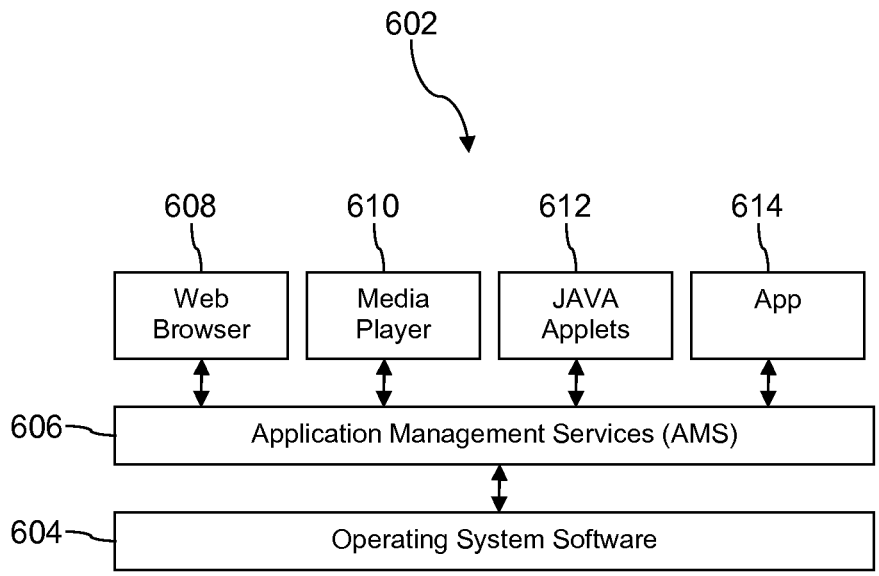
FIG. 5A is a block diagram of a software architecture for an electronic device according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, JAVA applets 612, and a generic application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The generic application 614 may be substantially similar to the generic application 120 described above.

Figure 5B:
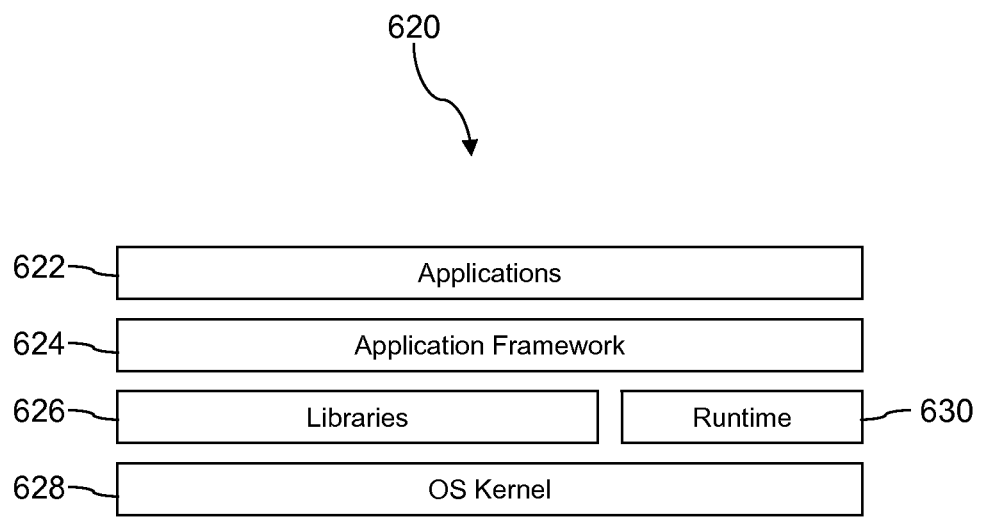
FIG. 5B is a block diagram of another software architecture for an electronic device according to an embodiment of the disclosure.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
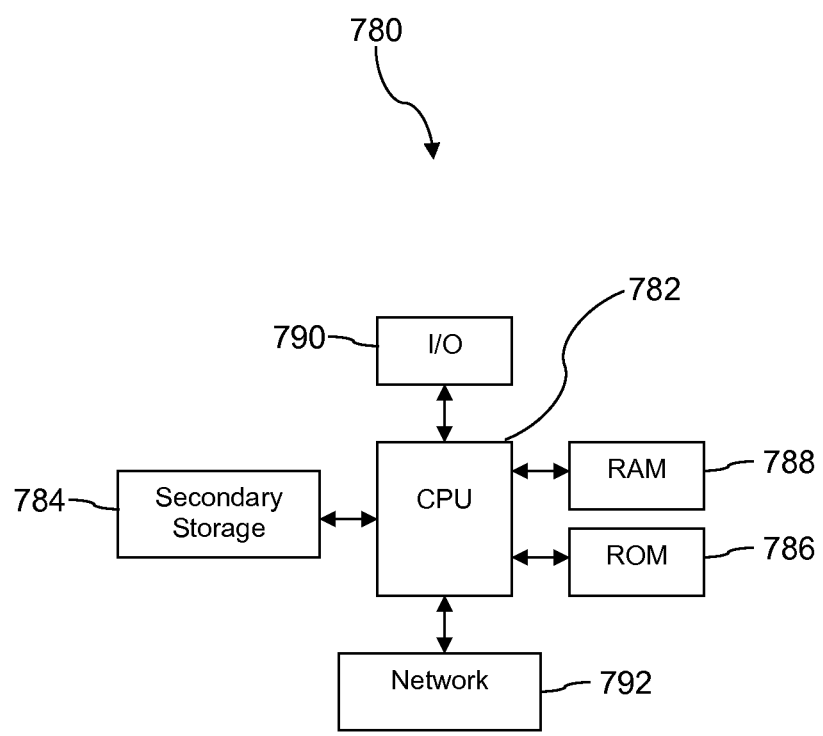
FIG. 6 is a block diagram of a computer system according to an embodiment of the disclosure.

FIG. 6 illustrates a computer system 780 suitable for implementing one or more embodiments disclosed herein. For example, the server 134 described above with reference to FIG. 1 may be implemented as the computer system 780 described below. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or more multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, a magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile phone, comprising:
   a processor;
   a memory comprising a system partition and a data partition; and
   a generic application stored in the system partition of the memory that, when executed by the processor,
      determines a branding status of the mobile phone, wherein the branding status is initially set to an unbranded status;
      determines a brand identity associated with the mobile phone, wherein the generic application determines the brand identity at least in part based on a network access identity (NAI) associated with the mobile phone,
      accesses branding assets associated with the generic application based on the brand identity, wherein the branding assets are accessed from a plurality of preloaded branding assets stored in the memory, and wherein the branding assets comprise two or more of a splash screen, a wallpaper, a background, a user interface style, a color scheme, an aural cue, an icon, or a real simple syndication (RSS) address,
      adapts a presentation screen of the mobile phone based on the accessed branding assets, and
      updates the branding status of the mobile phone to a branded status based on the brand identity, wherein the base functionality of the generic application remains the same in both the unbranded status and the branded status, and wherein the mobile phone is updated from the unbranded status to the branded status without re-provisioning the generic application.

2. The mobile phone of claim 1, wherein the generic application determines the brand identity at least in part based on a brand identity parameter provided in an open mobile alliance (OMA) message wirelessly received by the mobile phone.

3. The mobile phone of claim 1, wherein the generic application is one of a web browser application, a phone dialer application, a calendar application, an electronic mail application, and a voice mail application.

4. The mobile phone of claim 1, wherein the branding assets are stored in the data partition of the memory.

5. An electronic device, comprising:
   a processor;
   a memory; and
   a generic application stored in the memory that, when executed by the processor,
      determines a first brand identity associated with the electronic device at a first time,
      accesses a plurality of first branding assets associated with the generic application based on the first brand identity, wherein the plurality of first branding assets are stored in the memory,
      adapts a presentation screen of the electronic device based on the accessed plurality of first branding assets, whereby the generic application provides a first branded user experience,
      determines a second brand identity associated with the electronic device at a second time, wherein the generic application determines the second brand identity based on at least one of a network access identity (NAI) associated with the mobile phone or a brand identity parameter provided in a wirelessly received message from a wireless network,
      accesses a plurality of second branding assets associated with the generic application based on the second brand identity, wherein the plurality of second branding assets are stored in the memory, and
      adapts the presentation screen of the electronic device based on the accessed plurality of second branding assets, whereby the generic application provides a second branded user experience, wherein the first branded user experience is different from the second branded user experience,
      wherein the base functionality of electronic device remains the same for both the first brand identity and the second brand identity, and wherein the electronic device adapts from the first brand identity to the second brand identity without re-provisioning the generic application.

6. The electronic device of claim 5, wherein the electronic device is manufactured as an unbranded electronic device and wherein the first brand identity is associated with the electronic device after the manufacturing process has completed.

7. The electronic device of claim 5, wherein the electronic device is one of a mobile phone, a personal digital assistant (PDA), and a media player.

8. The electronic device of claim 5, wherein the first plurality of branding assets and the second plurality of branding assets are pre-loaded in the memory.

9. The electronic device of claim 5, wherein at least some of the second plurality of branding assets are downloaded to the electronic device via a wireless communication link.

10. The electronic device of claim 5, wherein one of the first brand identity or the second brand identity is associated with a mobile virtual network operator (MVNO) brand.

11. The electronic device of claim 5, wherein the generic application is stored in a system partition of the memory and wherein the first plurality of branding assets are stored in a carrier partition of the memory.

12. The electronic device of claim 5, wherein at least one of the plurality of first branding assets or the plurality of second branding assets comprise two or more of a splash screen, a wallpaper, a background, a user interface style, a color scheme, an aural cue, an icon, or a real simple syndication (RSS) address.

13. The electronic device of claim 5, wherein the generic application determines the second brand identity at least in part based on a brand identity parameter provided in an open mobile alliance (OMA) message wirelessly received by the mobile phone.

14. An electronic device, comprising:
   a processor;
   a memory; and
   a generic application stored in the memory that, when executed by the processor,
      determines a first branding status of the electronic device, wherein the first branding status comprises at least one of an unbranded status or a branded status based on a first brand identity;
      determines a second brand identity associated with the electronic device, wherein the generic application determines the second brand identity based at least in part based on one of a network access identity (NAI) associated with the mobile phone or an open mobile alliance (OMA) message wirelessly received by the mobile phone,
      accesses a first plurality of branding assets associated with the generic application based on the second brand identity,
      accesses subscriber profile information, where the subscriber profile information comprises at least one of a sex of the subscriber, an age of the subscriber, a city of the subscriber, an education level of the subscriber, an income level of the subscriber, a sports team affiliation of the subscriber, or a personal interest of the subscriber,
      accesses a second plurality of branding assets selected from the first plurality of branding assets associated with the generic application based on the subscriber profile information,
      adapts a presentation screen of the electronic device using the second plurality of branding assets, and
      updates a branding status of the electronic device to a second branding status based on the second brand identity, wherein the base functionality of electronic device remains the same for both the first branding status and the second branding status, and wherein the electronic device updates from the first branding status to the second branding status without re-provisioning the generic application.

15. The electronic device of claim 14, wherein the subscriber profile information is accessed by the electronic device from a server computer.

16. The electronic device of claim 14, wherein the generic application further adapts the function of the generic application by selecting a real simple syndication (RSS) feed to activate.

17. The electronic device of claim 14, wherein the generic application further adapts the function of the generic application by disabling access to the generic application.

18. The electronic device of claim 14, wherein the electronic device is a mobile phone.

19. The electronic device of claim 14, wherein the generic application and at least some of the first plurality of branding assets are stored in a system partition of the memory.

20. The electronic device of claim 14, wherein the second plurality of branding assets comprise two or more of a splash screen, a wallpaper, a background, a user interface style, a color scheme, an aural cue, an icon, or a real simple syndication (RSS) address.

* * * * *